(12) United States Patent
Hata et al.

(10) Patent No.: US 8,692,929 B2
(45) Date of Patent: Apr. 8, 2014

(54) LENS DRIVE DEVICE, IMAGE-CAPTURING DEVICE, AND ELECTRONIC APPARATUS WITH SHAPE MEMORY ALLOY ACTUATOR

(75) Inventors: Kazuhiro Hata, Osaka (JP); Hirohiko Ina, Hyogo (JP)

(73) Assignee: Panasonic Corporation, Osaka (JP)

( * ) Notice: Subject to any disclaimer, the term of this patent is extended or adjusted under 35 U.S.C. 154(b) by 527 days.

(21) Appl. No.: 13/003,336

(22) PCT Filed: Mar. 5, 2010

(86) PCT No.: PCT/JP2010/001539
§ 371 (c)(1),
(2), (4) Date: Jan. 10, 2001

(87) PCT Pub. No.: WO2010/103763
PCT Pub. Date: Sep. 16, 2010

(65) Prior Publication Data
US 2011/0128434 A1 Jun. 2, 2011

(30) Foreign Application Priority Data

Mar. 10, 2009 (JP) ................................ 2009-056205
Mar. 11, 2009 (JP) ................................ 2009-057713

(51) Int. Cl.
*G03B 13/00* (2006.01)
(52) U.S. Cl.
USPC .......................................... 348/357; 348/349
(58) Field of Classification Search
USPC ........................................ 348/357, 374, 349
See application file for complete search history.

(56) References Cited

U.S. PATENT DOCUMENTS

| | | | |
|---|---|---|---|
| 6,430,368 B1 | 8/2002 | Hata | |
| 7,518,649 B2 * | 4/2009 | Murakami | 348/333.01 |
| 7,626,621 B2 * | 12/2009 | Ito et al. | 348/294 |
| 7,656,460 B2 * | 2/2010 | Wernersson | 348/374 |
| 7,886,535 B2 * | 2/2011 | Matsuki | 60/528 |
| 8,068,167 B2 * | 11/2011 | Honda et al. | 348/357 |
| 8,189,093 B2 * | 5/2012 | Tanimura et al. | 348/357 |
| 8,350,959 B2 * | 1/2013 | Topliss et al. | 348/374 |
| 8,593,568 B2 * | 11/2013 | Topliss et al. | 348/374 |
| 2008/0278590 A1 | 11/2008 | Tanimura et al. | |
| 2009/0007561 A1 | 1/2009 | Matsuki | |
| 2009/0009656 A1 | 1/2009 | Honda et al. | |

FOREIGN PATENT DOCUMENTS

JP 08-186752 A 7/1996
(Continued)

OTHER PUBLICATIONS

International Search Report for Application No. PCT/JP2010/001539. Jun. 1, 2010, Panasonic Corporation.

*Primary Examiner* — Ngoc-Yen Vu
(74) *Attorney, Agent, or Firm* — RatnerPrestia

(57) ABSTRACT

An image-capturing device includes a detector which detects that a resistance value of an actuator, made of shape memory alloy, is maintained within a predetermined range. The image-capturing device moves a lens step by step from a place corresponding to a first field in order to obtain image data from each one of the fields provided in a focus region. The image-capturing device also calculates a target place, where the lens should be finally positioned, by using the obtained image data, and then positions the lens at the calculated target place. The foregoing structure allows obtaining reliable and stable data.

12 Claims, 9 Drawing Sheets

(56) References Cited

FOREIGN PATENT DOCUMENTS

| | | |
|---|---|---|
| JP | 09-127398 A | 5/1997 |
| JP | 2000-330009 A | 11/2000 |
| JP | 2001-66494 A | 3/2001 |
| JP | 2004-85964 A | 3/2004 |
| JP | 2006-235224 A | 9/2006 |
| JP | 2006-235224 A | 9/2006 |
| JP | 2006-267178 A | 10/2006 |
| JP | 2006-267178 A | 10/2006 |
| JP | 2007-211754 A | 8/2007 |
| JP | 2008-28079 A | 11/2008 |
| JP | 2009-013891 A | 1/2009 |
| JP | 2009-013909 A | 1/2009 |

* cited by examiner

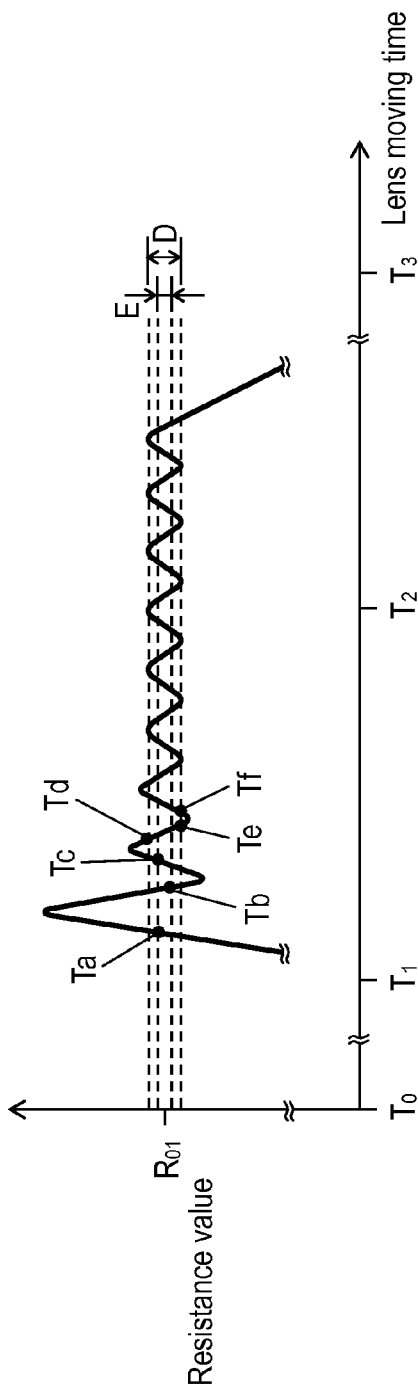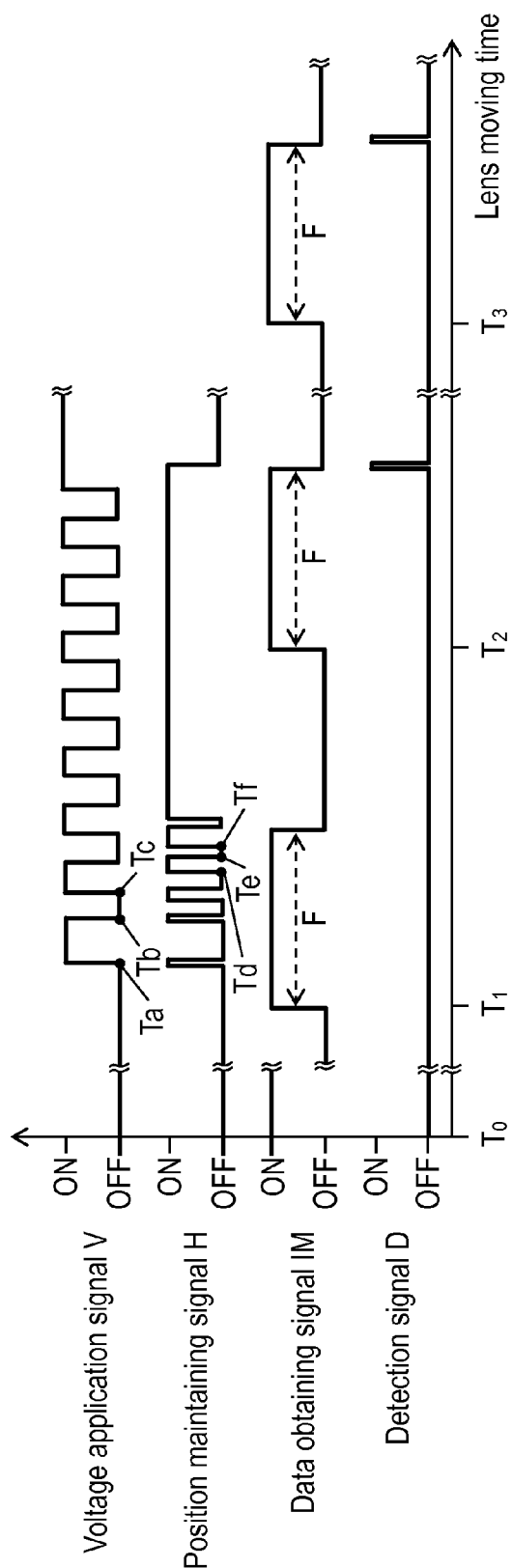
FIG. 5A
FIG. 5B

LENS DRIVE DEVICE, IMAGE-CAPTURING DEVICE, AND ELECTRONIC APPARATUS WITH SHAPE MEMORY ALLOY ACTUATOR

This application is a U.S. National Phase Application of PCT International Application PCT/JP2010/001539.

TECHNICAL FIELD

The present invention relates to a lens drive device for driving a lens movable along an optical axis, an image-capturing device including an image sensor which receives light through the lens, and an electronic apparatus including the image-capturing device

BACKGROUND ART

A conventional lens drive device includes an actuator made of shape-memory alloy. When receiving electric power, the actuator generates heat and then contracts, thereby moving the lens along a predetermined direction. The actuator then dissipates the heat in due course and expands, thereby moving the lens along the opposite direction.

An image-capturing device including the foregoing lens drive device controls a position of the lens with a resistance value varying in response to a deformation amount of the actuator, namely, the resistance value decreases in response to the contraction and increases in response to the expansion. (Refer to Patent Literature 1.)

In the foregoing image-capturing device, a voltage is applied to the actuator for generating heat when the resistance value exceeds a given value, and an application of the voltage is halted when the resistance value becomes smaller than the given value for inviting spontaneous heat dissipation. The voltage application and the halt of the application are repeated, so that the resistance value of the actuator can converge step by step on a given value. When the resistance value of the actuator agrees with the given value corresponding to a predetermined place of the lens, the image-capturing device recognizes that the lens is positioned at the predetermined place.

As discussed above, the resistance value of the actuator can be kept around a certain value; however, it is practically hard to maintain the resistance value rightly at the certain value. In other words, it is difficult for the image-capturing device to fix the lens at a certain place exactly. When the camera device recognizes that the lens is positioned at the predetermined place although the resistance value of the actuator is not stabilized yet, namely, the lens position is not yet fixed exactly or steadily, the data obtained through the lens can be short in stability or reliability.

Another image-capturing device including an actuator made of shape-memory alloy is disclosed in, e.g. Patent Literature 2, however, this literature is silent about how to control the lens.

Still another conventional image-capturing device formed of a lens movable along an optical axis and an image sensor, which receives light through the lens, is disclosed in, e.g. Patent Literature 3. This image-capturing device controls a position of the lens step by step in order to obtain data from respective fields provided in a focus region. A movement of the lens entails a decrease in a focus evaluation value, e.g. a decrease in brightness of image data, and the recognition of the decrease determines that the lens position in the event that the focus evaluation value starts falling is a target place.

The image-capturing device according to Patent Literature 3, however, has encountered a problem that the lens cannot be stopped at a desired target place, i.e. the place where the lens is supposed to stop. For movement of the lens produces a change in the focus evaluation value, so that a target place cannot be clearly recognized in such a case as: an image is shot around sunset, or an image is shot under poor sunlight, or multiple subjects should be shot.

RELATED ART LITERATURE

Patent Literature 1: Unexamined Japanese Patent Application Publication No. 2007-211754
Patent Literature 2: Unexamined Japanese Patent Application Publication No. H09-127398
Patent Literature 3: Unexamined Japanese Patent Application Publication No. H08-186752

DISCLOSURE OF INVENTION

The present invention aims to provide a lens drive device, an image-capturing device, and an electronic apparatus which allow obtaining stable and reliable data through a lens. The present invention also aims to provide an image-capturing device that can stop the lens at a desired place regardless of shooting environment or a subject to be shot.

The lens drive device of the present invention comprises the following structural elements:
 a lens movable in a moving region;
 an actuator made of shape-memory alloy for moving the lens;
 a controller for controlling a position of the lens based on a characteristic value of the actuator, where the characteristic value varies in response to deformation of the actuator; and
 a detector for detecting that the characteristic value is maintained within a predetermined range, and for outputting a detection signal thereof.

An image-capturing device of the present invention comprises the following structural elements:
 the foregoing lens drive device; and
 an image sensor for receiving light through the lens.
The lens is movable in a moving region corresponding to a focus region. The controller moves the lens step by step from a place corresponding to a first field in order to obtain image data from respective fields provided in the focus region, and calculates a target place, where the lens should be finally positioned, from the obtained image data, and then positions the lens at the target place based on the calculation.

An image-capturing device of the present invention comprises the following structural elements:
 a lens movable in a moving region corresponding to a focus region;
 an image sensor for receiving light through the lens; and
 a controller for obtaining image data received by the image sensor and controlling a position of the lens.
The image-capturing device allows the controller to move the lens step by step in order to obtain image data from respective fields in the focus region. The controller thus moves the lens across the entire moving region for obtaining the image data from all the fields, and then calculates a target place, where the lens should be stopped, from the obtained image data, and then the controller stops the lens at the calculated target place.

An electronic apparatus of the present invention includes one of the image-capturing devices discussed above.

The foregoing structures allow stopping the lens at the target place regardless of a shooting environment or a subject to be shot, thereby obtaining stable and reliable data through the lens.

BRIEF DESCRIPTION OF DRAWINGS

FIG. 5A shows another relation between the lens moving time of the image-capturing device and the resistance value of the actuator in accordance with the first embodiment.

FIG. 5B shows relations between the lens moving time of the image-capturing device and various signals.

DETAILED DESCRIPTION OF PREFERRED EMBODIMENTS

Exemplary Embodiment 1

Figure 1A:
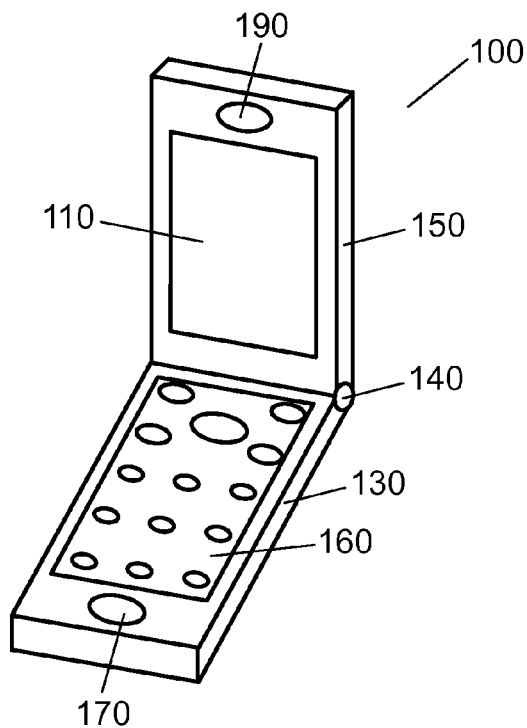
FIG. 1A shows a perspective view of an electronic apparatus in accordance with a first embodiment of the present invention.
Figure 1B:
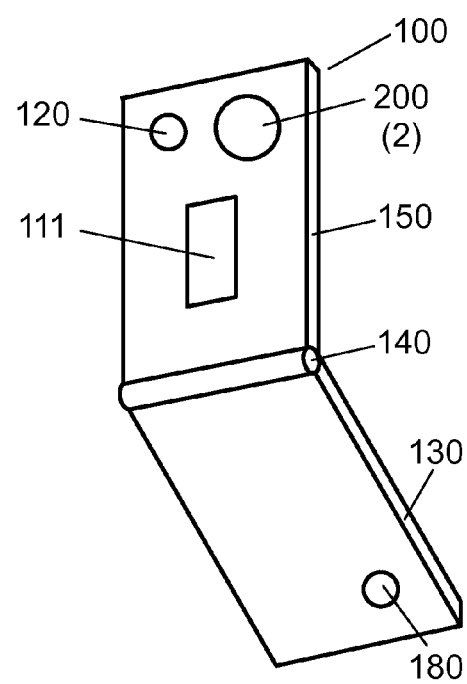
FIG. 1B shows another perspective view of the electronic apparatus in accordance with the first embodiment of the present invention.
Figure 2:
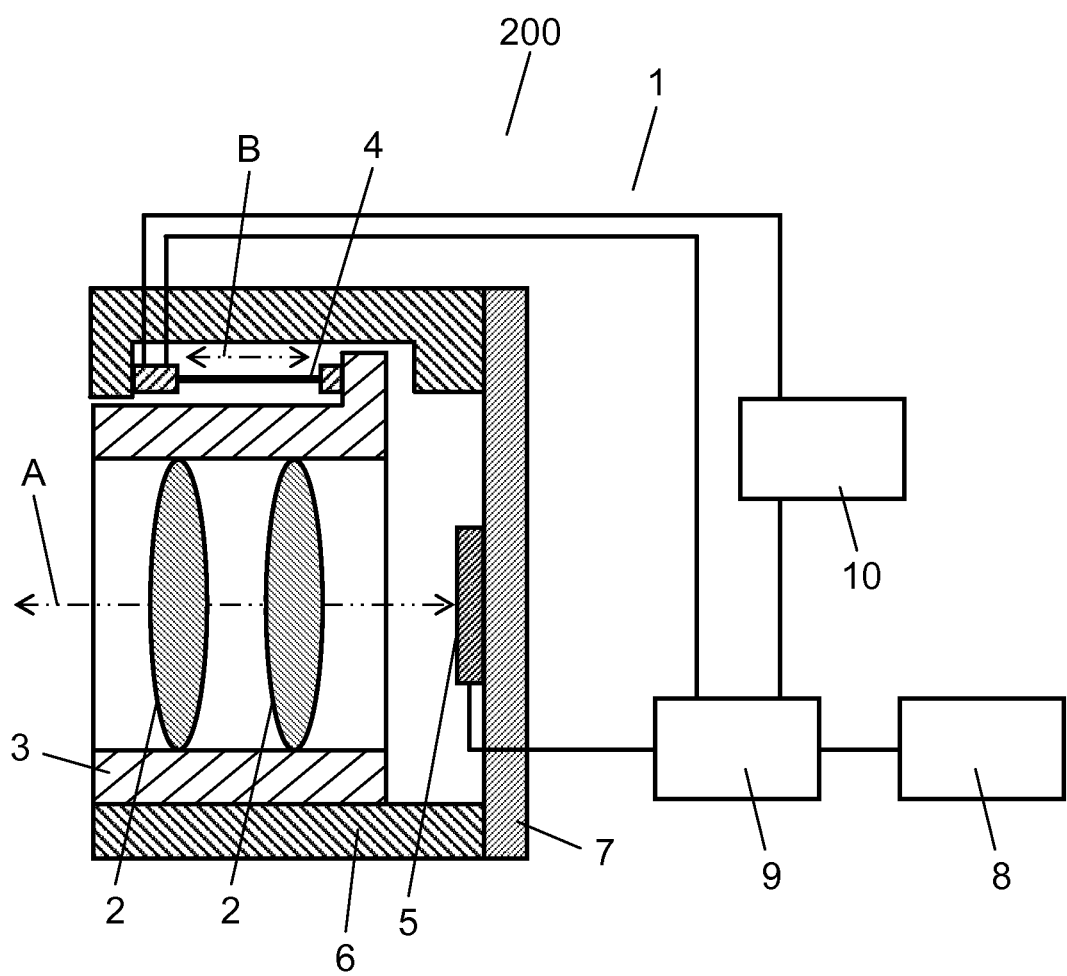
FIG. 2 schematically illustrates an image-capturing device included in the electronic apparatus in accordance with the first embodiment.

The first embodiment is demonstrated hereinafter with reference to FIG. 1-FIG. 9. FIG. 1A and FIG. 1B show perspective views of an electronic apparatus in accordance with the first embodiment. FIG. 2 schematically illustrates an image-capturing device included in the electronic apparatus in accordance with the first embodiment.

The electronic apparatus in accordance with the first embodiment is portable and foldable telephone 100. FIG. 1A shows a perspective view of an unfolded state of telephone 100 viewed along a direction that exposes a main display (first display 110 described later). FIG. 1B shows a perspective view of telephone 100 viewed along a direction that exposes a rear face opposite to a front face where the main display is fitted.

Portable telephone 100 has a digital camera function, namely, it includes image-capturing device 200, and is formed of first main unit 130 and second main unit 150 foldable via hinge mechanism 140.

First main unit 130 includes key-section 160 on an inner face of folded telephone 100, and key-section 160 is formed of numeral keys and others for operating telephone 100. First main unit 130 further includes microphone 170 through which voice of a user is input, and sounder 180 provided on an outer face of folded telephone 100 for informing the user of a message arrival.

Second main unit 150 includes speaker 190 on an inner face of folded telephone 100 for outputting arrival sound to the user, and a first display 110 for displaying letters or images. Second main unit 150 further includes, on an outer face of folded telephone 100, second display 111 for displaying letters or images as first display 110 does, light emitting element 120, and lens 2 for condensing light reflected from a subject (light from element 120 and sunlight).

Image-capturing device 200 includes lens drive device 1 as shown in FIG. 2. Lens drive device 1 is formed of lens 2 and lens barrel 3 accommodating lens 2 and movable along an optical axis (along the left-right arrow A shown in FIG. 2.) Lens drive device 1 includes actuator 4 made of shape-memory alloy (SMA). Actuator 4 is deformed when it receives an amount of heat such as an electric power, current, or voltage, thereby moving lens 2 via lens barrel 3. The amount of heat can be supplied from, e.g. an external heater.

Lens drive device 1 further includes controller 9 and detector 10. Controller 9 controls a position of lens 2 based on a characteristic value, e.g. a resistance value of actuator 4, and this value varies in response to the deformation of actuator 4. Detector 10 detects that the resistance value of actuator 4 is maintained within a given range. The characteristic value of actuator 4 is not limited to the resistance value, but it can be an electric current value or a voltage value based on the resistance value.

Image-capturing device 200 includes lens drive device 1, image sensor 5 for receiving light via lens 2, housing 6 for accommodating lens barrel 3, substrate 7, on which image sensor 5 is mounted, to be fixed to housing 6, and display device 8 for displaying image data captured by image sensor 5.

Lens 2 moves together with lens barrel 3 such that they are movable at least in a region (hereinafter referred to as a moving region) corresponding to a focus region in device 200. In this first embodiment, image-capturing device 200 is equipped with two lenses 2; however, it can be equipped with one lens 2 or more than two lenses 2.

Lens barrel 3 shapes like a cylinder and is placed such that the axial center of barrel 3 can agree with the optical axis, and is guided by a guiding section, e.g. a groove (not shown), provided to housing 6 so that lens barrel 3 can move stably along the optical axis. For the guiding purpose, lens barrel 3 includes a pilot section, e.g. a protrusion (not shown), to be engaged with the groove.

Actuator 4 shapes like a letter "V" so that a line of the shape-memory alloy can be extended, which allows the lens to move in the greater range. (In FIG. 2, the two sides of letter "V" overlap with each other.) Actuator 4 is fixed to housing 6 at both the ends of letter "V", and fixed to lens barrel 3 at the center (valley) of letter "V". Applying a voltage to actuator 4 deforms (expands or contracts) actuator 4 along the optical axis, i.e. along arrow B in FIG. 2. As a result, the distance between lens barrel 3 and housing 6 can be adjusted, whereby lens 2 is moved.

To be more specific, a voltage is applied to actuator 4, which then generates heat and contracts, thereby moving lens 2 along a given direction, and a halt of the voltage application invites spontaneous heat dissipation from actuator 4, which thus expands, thereby moving lens 2 along the opposite direction. In other words, the contraction of actuator 4 moves lens 2 apart from image sensor 5, and the expansion of actuator 4 moves lens 2 closer to image sensor 5.

Controller 9 monitors the resistance value varying in response to the deformation of actuator 4, thereby controlling an amount of the deformation for controlling the position of lens 2. Controller 9 moves lens 2 step by step from the position corresponding to a first field in order to obtain image data of respective fields provided to the focus region. Controller 9 also calculates a target place, where lens 2 should be finally positioned, by using the obtained image data, and then positions lens 2 at the target place based on the calculation.

During the foregoing procedure, controller 9 controls the direction, along which lens 2 moves step by step from the place corresponding to the first region, to be the direction along which lens 2 can be moved by the contraction of actuator 4. Controller 9 controls an amount electric power supplied to actuator 4 by the PWM (pulse width modulation) control method. To be more specific, the voltage applied to actuator 4 is controlled by varying a time of application of a given voltage (pulse width).

Detector 10 outputs a detection signal when it detects that the resistance value of actuator 4 is maintained within a predetermined range during a given time.

Image-capturing device 200 in accordance with the first embodiment is structured as discussed above. Next, the control operation of image-capturing device 200 is demonstrated hereinafter. To be more specific, lens control with the auto-focus function of device 200 is described hereinafter with reference to FIG. 3-FIG. 5B.

Figure 3:
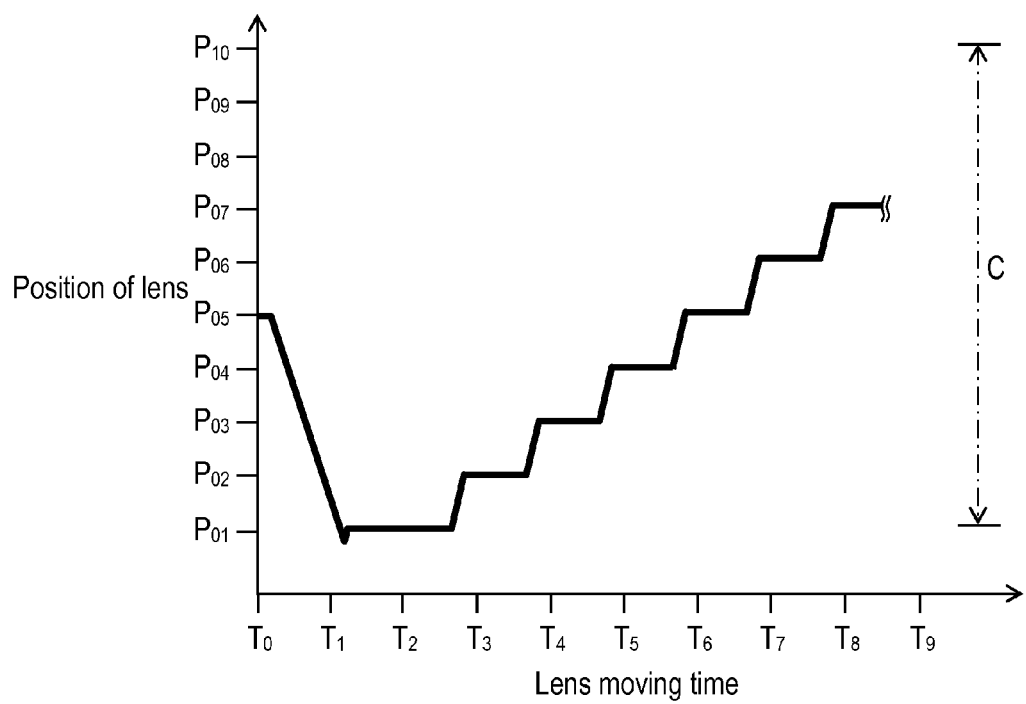
FIG. 3 shows a relation between a lens moving time of the image-capturing device and a position of the lens in accordance with the first embodiment.
Figure 4A:
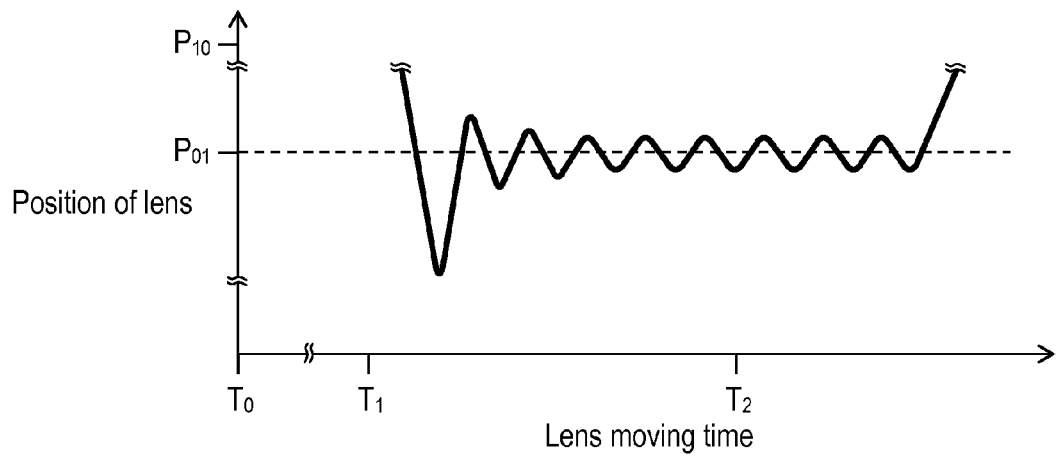
FIG. 4A shows another relation between the lens moving time of the image-capturing device and a position of the lens in accordance with the first embodiment.
Figure 4B:
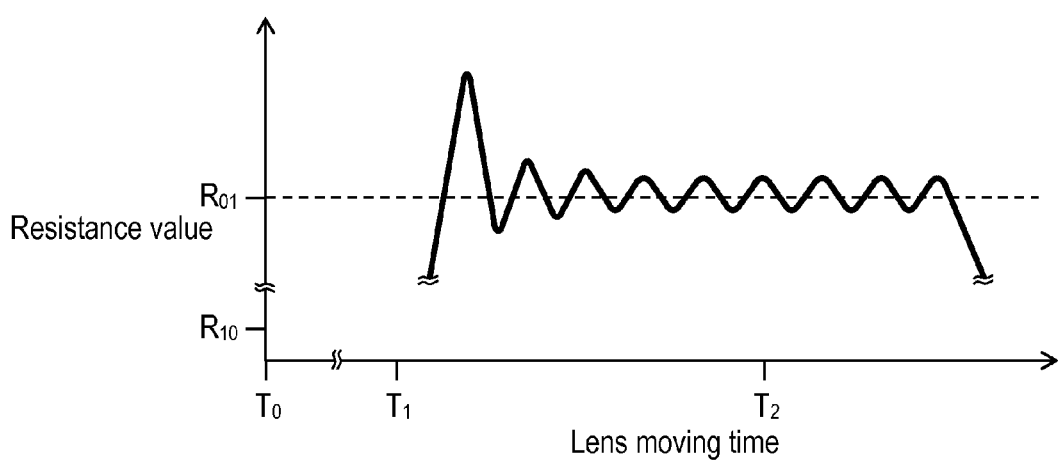
FIG. 4B shows a relation between the lens moving time of the image-capturing device and a resistance value of an actuator in accordance with the first embodiment.

FIG. 3 shows a relation between a lens moving time of image-capturing device 200 and a position of the lens. FIG. 4A shows another relation between the lens moving time of image-capturing device 200 and the position of the lens in accordance with the first embodiment. FIG. 4B shows a relation between the lens moving time of image-capturing device 200 and a resistance value of an actuator in accordance with the first embodiment. FIG. 5A shows another relation between the lens moving time of image-capturing device 200 and the resistance value of the actuator in accordance with the first embodiment. FIG. 5B shows relations between the lens moving time of image-capturing device 200 and various signals.

As shown in FIG. 3, controller 9 controls lens 2 movable in the moving region (region C in FIG. 3) to be positioned at a given place called a standby place, i.e. position P05, before a first scan during which controller 9 controls lens 2 to move step by step from position P01 corresponding to a first field.

In this context, "before the first scan" refers to the state where image-capturing device 200 is put in an initial mode, e.g. in the case of a camera, the camera is powered, or in the case of a portable telephone, the telephone is put in a camera mode, or device 200 is put in a standby mode, e.g. the camera or the portable phone is waiting for a shutter operation.

When image-capturing device 200 is put in an image-capturing mode, e.g. the camera or the portable phone has undergone the shutter operation, controller 9 stops applying a voltage to actuator 4, and spontaneous heat dissipation from actuator 4 expands actuator 4, so that lens 2 moves from standby place P05 to place P01 corresponding to the first field. Display device 8 displays the image data obtained at standby place P05 and freezes it during the movement of lens 2 from place P05 to place P01.

Positioning of lens 2 is detailed hereinafter with reference to FIG. 4A-FIG. 5B. In these drawings, the lens position corresponding to the "n"th field is referred to as "Pn", and the resistance value of actuator 4 corresponding to the "n"th field is referred to as "Rn".

The movement of lens 2 is correlated with the resistance value of actuator 4 as shown in FIGS. 4A and 4B: in a case, where lens 2 moves along the direction from place P10 to place P01, actuator 4 extends (lens 2 approaches image sensor 5), so that the resistance value of actuator 4 increases. In a case, where lens 2 moves along the direction from place P01 to place P10, actuator 4 contracts (lens 2 moves apart from image sensor 5), so that the resistance value thereof decreases.

In this first embodiment, as shown in FIGS. 5A and 5B, controller 9 outputs a voltage application signal or halts outputting the voltage application signal when the resistance value of actuator 4 falls outside a range smaller than a given range in order to maintain the resistance value within the given range. In this context, the given range refers to a maintenance range shown as range D in FIG. 5, and the range smaller than the given range refers to a control range shown as range E in FIG. 5.

To be more specific, when the resistance value of actuator 4 falls outside control range E toward a greater value, controller 9 outputs the voltage application signal, and when the resistance value falls inside control range E toward a smaller value, controller 9 halts outputting the voltage application signal, whereby the resistance value can be maintained within maintenance range D.

For instance, as shown in FIGS. 5A and 5B, the resistance value of actuator 4 exceeds control range E at time Ta, a voltage is applied to actuator 4. Then the resistance value falls short of control range E at time Tb, so that the voltage application to actuator 4 is halted. After that, the resistance value exceeds again control range E at time TC, so that the voltage is applied again to actuator 4. As discussed above, the voltage application and the halt of voltage application are repeated, thereby controlling the resistance value.

Controller 9 periodically obtains the image data captured by image sensor 5 and keeps obtaining the data for a given time (time F shown in FIG. 5B). Detector 10 outputs position-maintaining signal H while the resistance value of actuator 4 falls within maintenance range D. For instance, as shown in FIGS. 5A and 5B, since the resistance value falls in maintenance range D at time Td, detector 10 outputs position maintaining signal H. Then the resistance value falls short of maintenance range D at time Te, so that detector 10 stops outputting signal H; however, the resistance value then falls in range D again at time Tf, and then detector 10 re-outputs signal H.

During time F where controller 9 obtains the image data of a given field, when detector 10 keeps outputting position-maintaining signal H, i.e. when the resistance value of actuator 4 is kept falling within a given range, detector 10 outputs detection signal D. Supply of detection signal D thus prompts controller 9 to move lens 2 to a position corresponding to the next field. To the contrary, controller 9 obtains the image data of the given field again when no detection signal D is supplied.

To be more specific, in the span between time T1-time T2, controller 9 obtains the image data during time F, in this period of time F, position-maintaining signal H is not continuously output, so that even when controller 9 completes obtaining the image data of the first field, detector 10 outputs no detection signal D. Controller 9 thus obtains the image data again from the first field.

In the span between time T2-time T3, controller 9 obtains the image data during time F, since position-maintaining signal H is supplied continuously, detector 10 outputs detection signal D when controller 9 completes obtaining the image data. The supply of detection signal prompts controller 9 to apply a voltage to actuator 4 in order to obtain the image data from the second field.

As shown in FIG. 3, controller 9 moves lens 2 step by step from place P01, P02, P03, . . . , to P10 corresponding to respective fields (in this first embodiment, 10 fields are prepared), and obtains the image data of the respective fields provided to the focus region. At this time, controller 9 uses only the image data falling within a given range for the calculation from among two-dimensional data obtained from the respective fields. The calculation finds a focus evaluation value to be stored. The focus evaluation value is, e.g. a value to be found from a luminance signal as widely known. The greater focus evaluation value throws a subject into the better focus.

Controller 9 calculates a region (target region), which includes a target place, among the respective fields, by using the image data obtained from the respective fields. At this time, controller 9 determines a region, which corresponds to the field having the maximum evaluation value, as the target region.

For instance, in FIG. 3, it is determined that the focus evaluation values of respective fields from the second field to the sixth field are higher than those of the respective preceding fields, and the focus evaluation value of the seventh field is lower than that of the sixth field. As a result, when the focus evaluation value of the seventh field is stored, the region between the seventh and the sixth fields is determined as the target region. In other words, a first scan is completed without obtaining the image data from all the fields.

Figure 6:
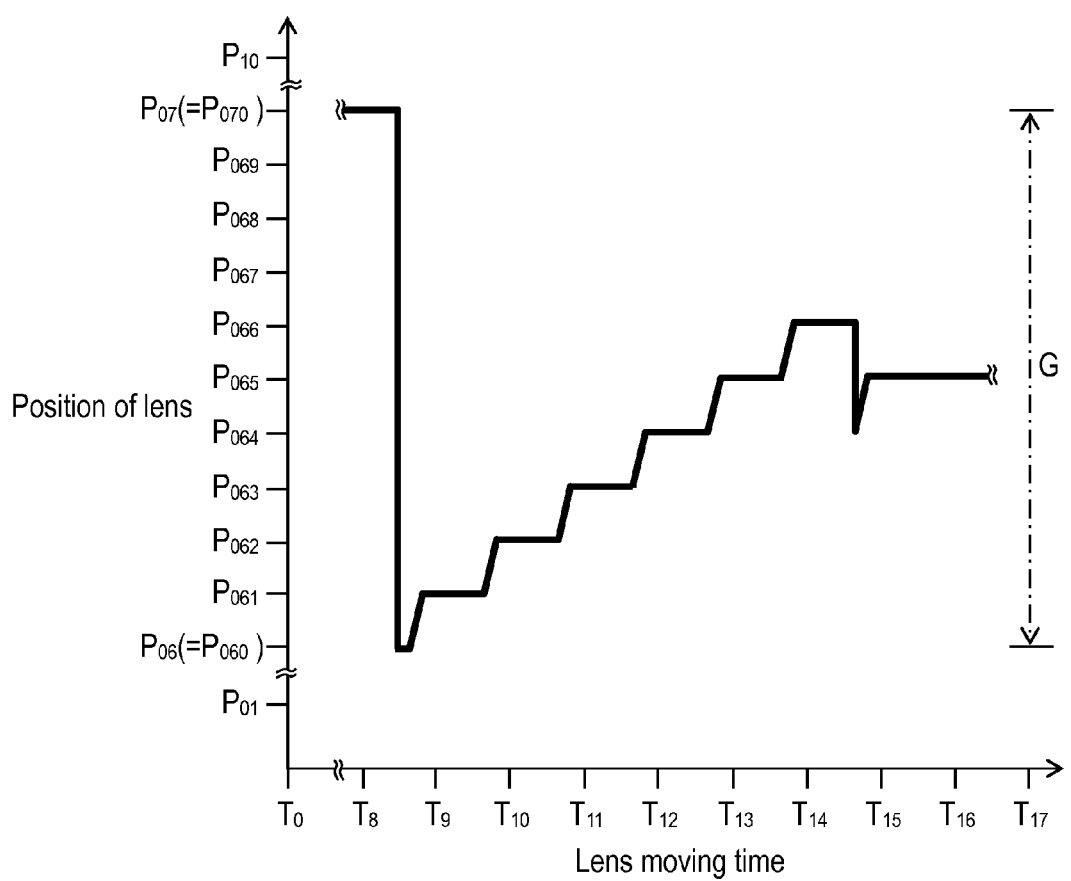
FIG. 6 shows a still another relation between the lens moving time of the image-capturing device and the position of the lens in accordance with the first embodiment.

Next, as shown in FIG. 6, controller 9 obtains image data of respective sub-fields formed by subdividing the target region (region G in FIG. 6, and this embodiment prepares nine sub-fields between a pair of fields adjacent to each other.) For this purpose, controller 9 moves lens 2 step by step from place P060 (=P06) corresponding to a first sub-field, in other words, controller 9 does a second scan.

At this time, controller 9 controls the direction, along which lens 2 moves step by step from the place corresponding to the first sub-field, to be the direction along which lens 2 can be moved by the contraction of actuator 4.

Since controller 9 has obtained the image data from the first sub-field, the step of obtaining the data can be omitted. Considering the hysteresis, controller 9 returns lens 2 to place P060 corresponding to the first sub-field, and then moves lens 2 to place P061 corresponding to the second sub-field. After that, controller 9 moves lens 2 for calculating the focus evaluation value by using the image data obtained from the sub-fields including the second sub-field and onward. Controller 9 thus calculates focus evaluation values one after another by using the image data already obtained from the first sub-field and other image data obtained thereafter, and determines the place corresponding to the sub-field, which has the maximum focus evaluation value, as the target place.

For instance, as shown in FIG. 6, it is determined that the focus evaluation values of the respective sub-fields from the second sub-fields (lens position P061) to the sixth sub-field (lens position P065) are higher than those of the respective preceding sub-fields, and the focus evaluation value of the seventh sub-field is lower than that of the sixth sub-field. As a result, when the focus evaluation value of the seventh sub-field is stored, the place P065 corresponding to the sixth sub-field is determined as the target place. In other words, the second scan is completed without obtaining the image data from all the sub-fields.

Then controller 9 positions lens 2 at the target place along the same direction as that of moving lens 2 step by step during the second scan (the direction along which lens 2 is moved step by step from the place corresponding to the first sub-field). This is because the hysteresis is taken into consideration.

At this time, when detector 10 detects that the resistance value of actuator 4 is maintained within the given range will, detector 10 outputs detection signal D, thereby informing controller 9 of the fact that lens 2 is positioned at the target place. Controller 9 thus obtains the image data after detection signal D is supplied.

As discussed above, lens drive device 1 and image-capturing device 200 in accordance with the first embodiment can detect that the resistance value of actuator 4 is maintained in the given range. As a result, it can be recognized that the resistance value of actuator 4 stays steadily, in other words, lens drive device 1 recognizes that lens 2 is positioned at the given place exactly and steadily. Stable and reliable data can be thus obtained through lens 2.

When lens 2 is moved step by step from the place corresponding to the first sub-field (during the first scan), image-capturing device 200 is deformed by the supply of electric power such that lens 2 can be moved along the given direction. In other words, in this embodiment, lens 2 can be moved step by step along the direction in which lens 2 is moved by the contraction of actuator 4.

In the case of moving lens 2 in the direction along which lens 2 is moved by the halt of supplying power or by the expansion of actuator 4, the deformation speed of actuator 4 cannot be selected because actuator 4 dissipates heat spontaneously. However, this first embodiment moves lens 2 by the supply of power or by the contraction of actuator 4, so that the deformation speed of actuator 4 can be flexibly controlled by means of controlling, e.g. a voltage application time (pulse width). As a result, lens 2 can be controlled more efficiently.

Image-capturing device 200 of the present invention is not limited to this first embodiment, and not to mention, device 200 can be modified within the gist of the present invention. For instance, detector 10 of image-capturing device 200 detects that the resistance values of actuator 4 are maintained within the respective given ranges, and then outputs the respective detection signals D in order to inform controller 9 of the fact that lens 2 is positioned at the places corresponding to the respective fields (the first field among others). In this case, controller 9 can obtain the image data of the respective fields after the respective detection signals D are supplied. This structure can replace the structure previously discussed, i.e. in the case of outputting no detection signal D, controller 9 obtains the data of the same field again, or this structure and the structure previously discussed can be used together. The presence of detection signal D can be determined by using an ACK (acknowledgment) signal used in communication.

Figure 7:
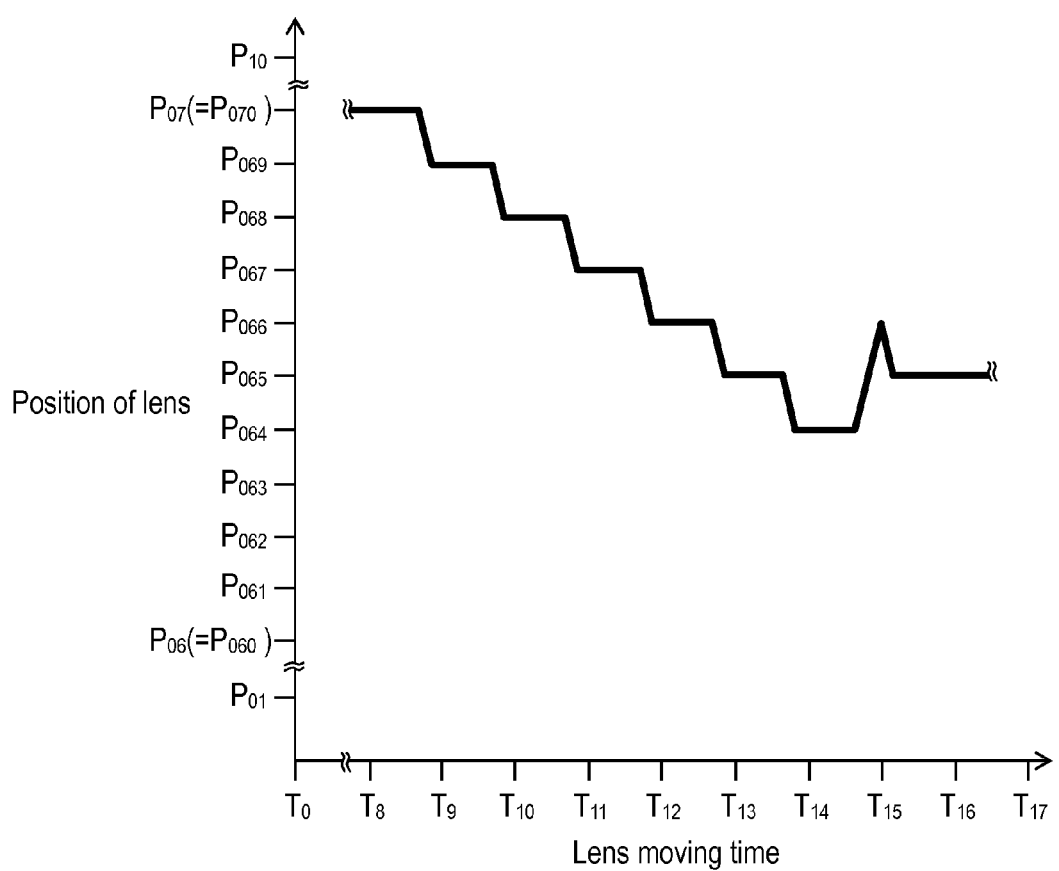
FIG. 7 shows a yet another relation between the lens moving time of the image-capturing device and the position of the lens in accordance with the first embodiment.

This first embodiment refers to controller 9 of image-capturing device 200 as it controls the direction of the second scan (the direction along which lens 2 is moved step by step from the place corresponding to the first sub-field) to be the direction along which lens 2 is moved by the contraction of actuator 4. The present invention is not limited to this case, but as shown in FIG. 7, it can control the direction to be the one along which lens 2 is moved by the expansion of actuator 4. FIG. 7 shows another relation between the lens moving time and the lens position during the second scan done by image-capturing device 200. To be more specific, FIG. 7 differs from FIG. 3 in the control method during the second scan, namely, the moving direction of lens 2 is controlled such that the application of a voltage is halted for lens 2 to be moved by the expansion of actuator 4. In this case, lens 2 moves from place P070 (=P07) toward place P060 (=P06). In the case of FIG. 7, it is determined that the focus evaluation value of the fifth sub-field (lens position is P064) is lower than that of the sixth sub-field (lens position is P065), so that at the moment when the focus evaluation value of the fifth sub-field is stored, place 065 corresponding to the sixth sub-field is determined as the target place. In other words, the second scan is completed without obtaining the image data of every sub-field.

In FIGS. 6 and 7, at the moment when a focus evaluation value of a certain sub-field is determined greater than a focus evaluation value of the sub-filed next to the certain sub-field, the certain sub-field is determined as a target place. However, it is not necessarily to bind the embodiment to this example. For instance, during the movement of lens 2 from a certain sub-field to the next one, at the moment when the focus evaluation value of the certain sub-field is greater than that of the next one, or at the moment when the focus evaluation value of the certain sub-field is greater than that of the next one and reaches a predetermined threshold, the certain sub-field can be determined as the target place.

As discussed above, the lens drive device in accordance with the first embodiment comprises the following structural elements:

lens 2 movable in a moving region;
actuator 4 made of shape-memory alloy for moving lens 2;
controller 9 for controlling a position of lens 2 based on a characteristic value, e.g. a resistance value of actuator 4, which value varies in response to the deformation of actuator 4; and
detector 10 for detecting that the characteristic value of actuator 4 is maintained within a given range.

The foregoing structure allows detecting that the resistance value of actuator 4 is maintained within the given range. As a result, the lens drive device can recognize that lens 2 is positioned at a given place with the resistance value of actuator 4 kept stable, i.e. lens 2 is positioned exactly and stably.

Image-capturing device 200 in accordance with this first embodiment includes lens drive device 1 discussed above and image sensor 5 which receives light through lens 2. Lens 2 is movable within a moving region corresponding to a focus region. Controller 9 moves lens 2 step by step from a place corresponding to a first field in order to obtain image data from the respective fields provided in the focus region. Controller 9 also calculates a target place, where lens 2 should be finally positioned, from the captured image data, and then positions lens 2 at the calculated target place.

The foregoing structure allows lens 2 movable in the region corresponding to the focus region to move step by step from a place corresponding to the first field among the fields provided in the focus region. This mechanism allows obtaining image data from the respective fields, and calculating the target place, where lens 2 should be finally positioned, based on the obtained image data, whereby lens 2 can be positioned at the target place. As a result, image data can be obtained from the respective fields while lens 2 is exactly and steadily positioned, or it can be determined whether or not the respective image data can be obtained with lens 2 exactly and steadily positioned.

Image-capturing device 200 in accordance with the first embodiment has detector 10 output a detection signal when detector 10 detects that the resistance value of actuator 4 is maintained within a given range while controller 9 obtains image data from a predetermined field. An output of the detection signal prompts controller 9 to move lens 2 to a position corresponding to the next field, and when no detection signal is output, controller 9 obtains the image data again from the predetermined field.

The foregoing structure allows detector 10 to output a detection signal, which indicates that the resistance value of actuator 4 is maintained within a given range, while controller 9 obtains image data from the predetermined field. The output of detection signal refers to that each image data has been obtained with lens 2 exactly and steadily positioned, and prompts lens 2 to move to a place corresponding to the next field. To the contrary, when no detection signal is output, it is determined that each image data has been obtained with lens 2 inexactly and unsteadily positioned (not finely adjusted), and then prompts controller 9 to obtain the image data again from the predetermined field.

Image-capturing device 200 in accordance with the first embodiment allows detector 10 to output a detection signal when detector 10 detects that the resistance value of actuator 4 is maintained within a given range in order to inform controller 9 of the fact that lens 2 is positioned at a place corresponding to the first field. After the output of the detection signal, controller 9 obtains the image data from the first field.

When detector 10 detects the resistance value of actuator 4 is maintained within the given range, the structure discussed above allows detector 10 to output a detection signal, thereby informing controller 9 of the fact that lens 2 is positioned at the place corresponding to the first field. After the supply of detection signal, controller 9 can obtain the image data from the first field with lens 2 exactly and steadily positioned at the place corresponding to the first field.

Image-capturing device 200 in accordance with the first embodiment allows detector 10 to output respective detection signals when the resistance values of actuator 4 are maintained within the respective ranges, so that detector 10 can inform controller 9 of the fact that lens 2 is positioned at places corresponding to respective fields. After the supply of respective detection signals, controller 9 obtains image data from the respective fields.

The foregoing structure allows detector 10 to output the detection signals when detector 10 detects that the resistance value of actuator 4 is maintained within the given range, so that detector 10 can inform controller 9 of the fact that lens 2 is positioned at places corresponding to respective fields. After the supply of detection signals, controller 9 thus can obtain image data from the respective fields with lens 2 exactly and steadily positioned at the places corresponding to the respective fields.

Image-capturing device 200 in accordance with this embodiment allows detector 10 to output a detection signal when detector 10 detects that the resistance value of actuator 4 is maintained within a given range so that detector 10 can inform controller 9 of the face that lens 2 is positioned at a target place. After the supply of the detection signal, controller 9 obtains image data.

When detector 10 detects that the resistance value of actuator 4 is maintained within the given range, detector 10 outputs a detection signal, thereby allowing detector 10 to inform controller 9 of the fact that lens 2 is positioned at the target place. After the supply of the detection signal, controller 9 obtains the image data from the target place with lens 2 exactly and steadily positioned at the target place.

On top of that, image-capturing device 200 in accordance with the first embodiment allows actuator 4 to be deformed when actuator 4 receives electric power such that lens 2 can move along a given direction. The halt of supplying the electric power allows actuator 4 to deform itself such that lens 2 can move in the direction opposite to the given direction. Controller 9 controls the direction of moving lens 2 step by step from a place corresponding to the first field to be the given direction along which actuator 4 can move lens 2 by supplying the electric power to actuator 4.

When lens 2 moves step by step from the place corresponding to the first field, lens 2 is moved along a direction by supplying electric power to actuator 4. In a case where the supply of electric power is halted in order to move lens 2 along the direction opposite to the given direction, the deformation speed of actuator 4 cannot be selected because actuator 4 dissipates heat spontaneously. However, the structure discussed above allows actuator 4 to move lens 2 in the direction along which lens 2 is moved by supplying the electric power to actuator 4, so that the control over the electric power (e.g. a voltage applied, or an application time of the voltage) supplied to actuator 4 allows flexibly selecting the deformation speed of actuator 4.

Image-capturing device 200 in accordance with the first embodiment allows actuator 4 to generate heat and to be deformed when it receives electric power, so that actuator 4 contracts, thereby moving lens 2 along a predetermined direction. The halt of supplying the electric power invites spontaneous heat dissipation from actuator 4, so that actuator 4 extends, thereby moving lens 2 along a direction opposite to the predetermined direction. Controller 9 controls the direction of moving lens 2 step by step from the place corresponding to the first field to be a direction along which lens 2 can be moved by the contraction of actuator 4.

When lens 2 moves step by step from the place corresponding to the first field in the direction, along which lens 2 can be moved by the contraction of actuator 4, and the contraction is caused by supplying electric power to actuator 4. The expansion of actuator 4 caused by halting the supply of the electric power moves lens 2; however, since spontaneous heat dissipation from actuator 4 produces this movement, the deformation speed of actuator 4 cannot be selected. The structure discussed in the previous paragraph allows lens 2 to move in a direction along which lens 2 can be moved by the contraction of actuator 4, so that the control over the electric power to be supplied (e.g. a voltage to be applied, or a voltage application time) allows flexibly selecting the deformation speed of actuator 4.

Image-capturing device 200 in accordance with this embodiment allows moving lens 2 step by step from a place corresponding to the first sub-field, and calculates a target place from the image data captured from the respective sub-field. Controller 9 thus can calculate a target region including the target place from respective image data captured from each field and can obtain the image data again from each one of multiple sub-fields produced by dividing the target region.

The foregoing structure allows image-capturing device 200 to carry out the following two steps:

first step: calculate the target region including the target place from among respective fields;

second step: move lens 2 across the multiple sub-fields, produced by dividing the target region, step by step from the place corresponding to the first sub-field, and obtain image data from each sub-field, and then calculate the target place from the image data obtained from each one of the sub-fields.

In the first step, where the target place is calculated from the image data of each field, each field should be sub-divided into a greater number of sub-fields in order to calculate the target place more accurately, which though adversely affects the calculation speed. To the contrary, calculating the target place at a higher speed cannot permit the subdivision of each field, so that the accurate calculation cannot be expected. This first embodiment thus can overcome this contradictory problem, and carries out the calculation in two steps, so that the target place can be calculated fast and accurately.

Image-capturing device 200 in accordance with this first embodiment allows controller 9 to control the direction of moving lens 2 step by step from a place corresponding to the first sub-field to be a predetermined direction along which lens 2 can be moved by the contraction of actuator 4.

The foregoing structure allows lens 2 to move step by step from the place corresponding to the first sub-field in the direction along which lens 2 can be moved by the contraction of actuator 4. This structure thus allows flexibly controlling the deformation speed of actuator 4 not only in the first step but also in the second step, where lens 2 is moved step by step from the place corresponding to the first sub-field, by controlling the electric power (e.g. a voltage to be applied, or a voltage application time) to be supplied. On top of that, the foregoing structure prevents lens 2 from slippage caused by the hysteresis of actuator 4.

Image-capturing device 200 in accordance with this embodiment allows controller 9 to control the direction of moving lens 2 step by step from the place corresponding to the first sub-field to be the opposite direction to the predetermined direction. Along the opposite direction, lens 2 can be moved by the expansion of actuator 4.

The foregoing structure allows lens 2 to move step by step from the place corresponding to the first sub-field in the direction along which lens 2 can be moved by the expansion of actuator 4. This structure thus allows expanding actuator 4, which has been contracted in the first step, by using spontaneous heat dissipation, thereby controlling the lens position. As a result, actuator 4 needs the smaller amount of electric power because the expansion of actuator 4 needs no electric power.

Image-capturing device 200 in accordance with this embodiment allows controller 9 to position lens 2 at the target place by moving lens 2 in the same direction as the one along which lens 2 is moved step by step from the place corresponding to the first sub-field.

The foregoing structure allows lens 2 to be positioned at the target place by the movement of lens 2 in the same direction as the one along which lens 2 is moved step by step from the place corresponding to the first sub-field. As a result, the slippage caused by the hysteresis of actuator 4 can be prevented.

Image-capturing device 200 in accordance with the first embodiment includes display device 8 which displays image data received by image sensor 5. Before controller 9 moves lens 2 step by step from the place corresponding to the first field, controller 9 controls lens 2 to be positioned at a given place, and display device 8 displays one piece of image data and freezes it during the movement of lens 2 from the given place to the place corresponding to the first field.

The foregoing structure allows display device 8 to show the image data received by image sensor 5, so that a user can monitor the image data anytime. Display device 8 displays one piece of image data and freezes it until controller 9 moves lens 2 from the predetermined place to the place corresponding to the first field. (The predetermined place refers to the place where lens 2 has been positioned before lens 2 is moved step by step from the place corresponding to the first field.) As a result, flicker on display device 8 can be prevented.

As discussed above, this first embodiment proves that image-capturing device 200 can recognize lens 2 to be positioned at a given place exactly and steadily, so that image-capturing device 200 can capture reliable and steady data through lens 2. Controlling over the electric power to be supplied allows flexibly controlling the deformation speed of actuator 4, so that lens 2 can be efficiently controlled. As a result, steady and reliable data can be obtained through lens 2.

The present invention is thus useful for electronic apparatuses such as digital cameras or digital video cameras (image-capturing apparatus).

Exemplary Embodiment 2

Figure 8:
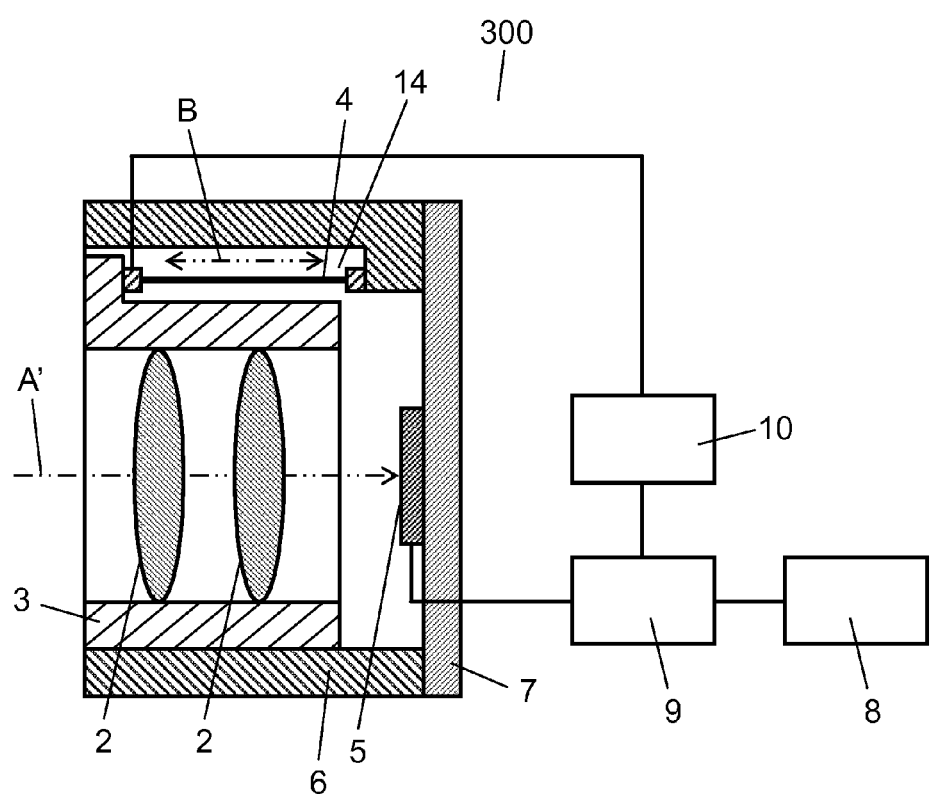
FIG. 8 schematically illustrates an image-capturing device in accordance with a second embodiment of the present invention.
Figure 9A:
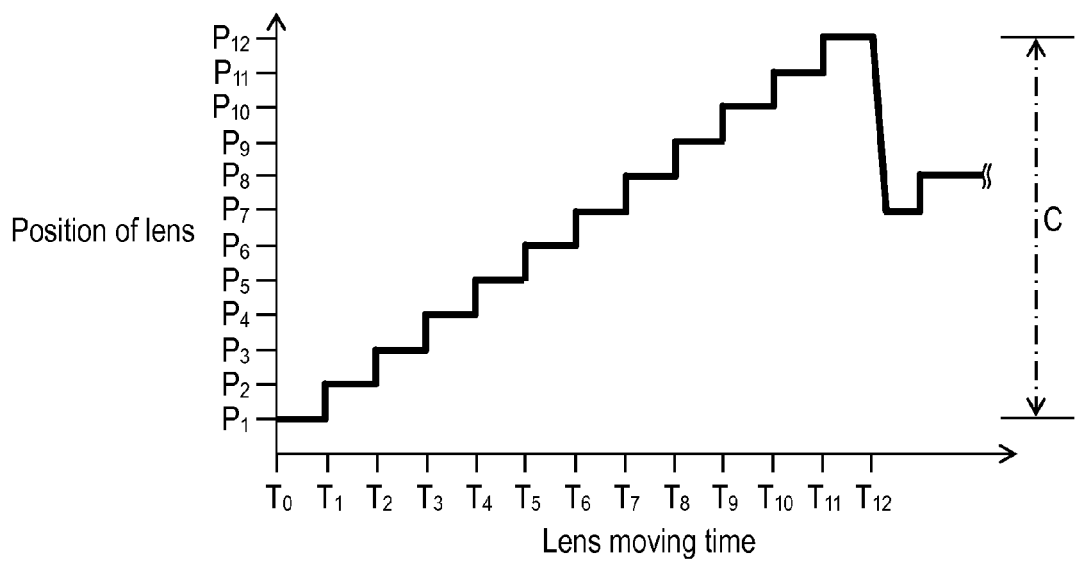
FIG. 9A shows a relation between a lens moving time of the image-capturing device and a position of the lens in accordance with the second embodiment.
Figure 9B:
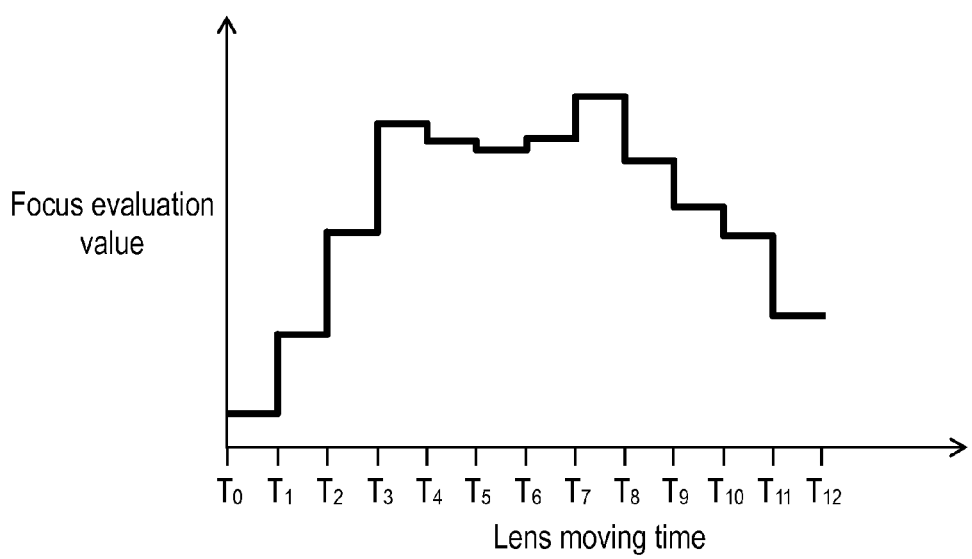
FIG. 9B shows a relation between the lens moving time of the image-capturing device and a focus evaluation value in accordance with the second embodiment.

Image-capturing device 300 in accordance with the second embodiment is demonstrated hereinafter with reference to FIGS. 8, 9A, and 9B. FIG. 8 schematically illustrates image-capturing device 300 in accordance with the second embodiment. FIG. 9A shows a relation between a lens moving time of image-capturing device 300 and a position of the lens in accordance with the second embodiment. FIG. 9B shows a relation between the lens moving time of image-capturing device 300 and a focus evaluation value in accordance with the second embodiment. Image-capturing device 300 is used in electronic apparatuses such as portable telephones as is explained in the first embodiment.

As shown in FIG. 8, image-capturing device 300 includes lens 2, lens barrel 3 accommodating lens 2 and movable together with lens 2 along an optical axis, image sensor 5 for receiving light through lens 2, and moving section 14 for moving lens 2 via lens barrel 3. In this context, the optical axis refers to, e.g. the direction indicated by arrow A' shown in FIG. 8, and lens 2 is moved along this direction by the contraction of actuator 4.

Image-capturing device 300 further includes housing 6 for accommodating lens barrel 3, substrate 7, on which image sensor 5 is mounted, to be fixed to housing 6. Image-capturing device 300 also includes controller 9 for obtaining image data received by image sensor 5 and controlling a position of lens 2 based on a resistance value of actuator 4, detector 10 for detecting that the resistance value of actuator 4 is maintained within a given range, and display device 8 for displaying the image data, received by image sensor 5, on the screen of display device 8. A characteristic value of actuator 4 is not limited to the resistance value of shape memory alloy, but it can be an electric current value or a voltage value based on the resistance value.

Lens 2 moves together with lens barrel 3 at least in a moving region corresponding to a focus region of image-capturing device 300. In this second embodiment, two lenses 2 are used; however, one lens or more than two lenses can be used.

Lens barrel 3 shapes like a cylinder and is placed such that the axial center of barrel 3 agrees with the optical axis, and is guided by, e.g. a guiding section (not shown) provided to housing 6 so that it can move stably along the optical axis. For this guiding purpose, lens barrel 3 has a pilot section (not shown) to be engaged with the guiding section.

Moving section 14 includes actuator 4 made of shape memory alloy (SMA) and capable of moving lens 2. For actuator 4 is deformed when it receives heat, e.g. electric power (electric current or voltage), and the deformation will move lens 2. To be more specific, moving section 14 includes actuator 4 which is fixed to lens barrel 3 and housing 6 respectively. Actuator 4 is deformed, i.e. expansion or contraction, along the optical direction (left-right arrow B in FIG. 8), whereby the distance between lens barrel 3 and housing 6 can be adjusted. The SMA employed in actuator 4 can shorten a stabilizing time necessary for lens 2 before the moving speed reaches a constant speed by approx. ⅓ comparing with employing a voice coil motor (VCM). An external heater can be used for supplying the foregoing heat to actuator 4.

Moving section 14 has lens 2 approach image sensor 5 by means of the contraction of actuator 4, because the supply of electric power, e.g. a voltage is applied, to actuator 4 heats and contracts actuator 4. To the contrary, the halt of the voltage application invites spontaneous heat dissipation from actuator 4, so that actuator 4 cools down and expands. Lens 2 thus moves away from image sensor 5. Actuator 4 shapes like letter "V" (in FIG. 8, two sides of letter "V" overlaps). Both ends of the letter "V" are fixed to lens barrel 3 and the center of letter "V", namely, the bottom of letter "V", is fixed to housing 6. The voltage application will deform actuator 4 along the optical axis, thereby moving lens 2 closer to image sensor 5. As a result, lens 2 can be moved while the distance between lens 2 and housing 6 can be adjusted.

Controller 9 controls the deformation of actuator 4, thereby controlling the position of lens 2. At this time, controller 9 uses a signal indicating a state variable of actuator 4 in order to increase the accuracy of positioning lens 2 and increase the moving speed of lens 2. For instance, the state variable of actuator 4 can be a resistance value (or its inverse number, namely, conductance) of actuator 4, or either one of a voltage or a current to be applied to actuator 4.

Controller 9 transmits the signal indicating the state variable for controlling the deformation amount of actuator 4, and also receives a signal indicating the state variable in order to feedback the state (deformation amount) of actuator 4 to detector 10. In other words, controller 9 can detect the present position of lens 2. Controller 9 includes an image signal processor (ISP) and a driver IC; however those ISP and driver IC can be placed independently.

Controller 9 moves lens 2 step by step to the places corresponding to respective fields in order to obtain image data from the respective fields provided in a focus region, and yet, controller 9 moves lens 2 across the entire moving region corresponding to the focus region in order to obtain the image data from each field (substantially all the fields) provided in the focus region.

On top of that, controller 9 calculates a target place, where lens 2 should be stopped, from the obtained image data, and then stops lens 2 at the target place. At this time, controller 9 uses only the image data falling within a given range for the calculation (integration) from among two-dimensional data obtained from the respective fields. The integration finds a focus evaluation value to be stored. After the movement of lens 2 across the entire moving region, controller 9 finds a position of lens 2 where the focus evaluation value takes the maximum value, and then determines this position as the target place.

While controller 9 obtains the image data from all the fields, display device 8 outputs the data of respective fields on the screen one after another based on the image data obtained sequentially. Display device 8 displays one piece of data and freezes it after controller 9 obtains the image data from all the fields until lens 2 stops at the target place. For instance, display device 8 shows a display based on the image data obtained at the target place and freezes this display.

The structure of image-capturing device 300 in accordance with the second embodiment is discussed hereinbefore. Next, a method of auto-focusing of image-capturing device 300 is discussed hereinafter. First, controller 9 controls the deformation amount of actuator 4, whereby lens 2 moves along a direction for approaching image sensor 5. To be more specific, lens 2 moves step by step while it stops in a given time ($\approx T_n - T_{n-1}$) at respective lens positions ($P_n$) corresponding to respective fields provided in the focus region.

In this second embodiment, 12 fields are provided in the focus region, namely, lens 2 stops at 12 places (not to mention, the present invention is not limited to these 12 places). Controller 9 stores the focus evaluation values based on the image data obtained from each field (respective lens positions Pn). In this case, only the maximum focus evaluation value can be stored.

Lens 2 moves across the entire moving region (indicated by left-light arrow C shown with an alternate long and short dash line in FIG. 9A) corresponding to the focus region, so that controller 9 can obtain the image data from all the fields (all the lens positions Pn) provided in the focus region. On top of that, controller 9 calculates the target place, e.g. P8, where the focus evaluation value takes the max. value, and then moves lens 2 to the target place.

At this time, controller 9 allows lens 2 to move temporarily in an opposite direction, i.e. move away from image sensor 5, to the direction along which lens 2 has moved for obtaining the image data from all the fields. Then after lens 2 oversteps the target place, e.g. lens position P8, lens 2 changes the moving direction, and approaches image sensor 5, i.e. the same direction as lens 2 has moved for obtaining the image data from all the fields. Lens 2 then stops at the target place, e.g. lens position P8. As discussed above, since lens 2 moves across the entire moving region, the image data all over the entire fields provided in the focus region can be obtained.

Controller 9 then calculates the target place, where lens 2 should be stopped, from the image data obtained across the entire fields provided in the focus region. As a result, lens 2 can be stopped at a desired place regardless of a shooting environment or a subject to be shot.

In other words, as a result of moving lens 2 across the entire moving region, the target place can be calculated this way: As shown in FIG. 9B, even when the focus evaluation value has two peaks, the first peak at lens position P4 is skipped, and the second peak at lens position P8, where the focus evaluation value takes the max. value, is determined as the target place. Lens 2 can be thus stopped at the desired target place P8.

Image-capturing device 300 in accordance with this second embodiment moves lens 2 along the direction approaching image sensor 5 while controller 9 obtains the image data from all the fields, and also moves lens 2 along the direction approaching image sensor 5 when controller 9 stops lens 2 at the target place. Lens 2 thus moves in the same direction in both the cases, i.e. when controller 9 obtains the image data (focus evaluation value) and when controller 9 stops lens 2 at the target place. This mechanism prevents errors, caused by hysteresis, in the movement of lens 2.

Not to mention, image-capturing device 300 in accordance with the second embodiment is not limited only to this embodiment, but can be modified in various ways as far as it stays within the gist of the present invention. For instance, controller 9 moves lens 2 away from image sensor 5 while controller 9 obtains the image data from all the fields, and also moves lens 2 away from image sensor 5 when controller 9 stops lens 2 at the target place. Lens 2 thus moves in the same direction in both the cases, i.e. while controller 9 obtains the image data (focus evaluation value) and when controller 9 stops lens 2 at the target place. This mechanism prevents the errors, caused by the hysteresis, in the movement of lens 2.

Contrary to the foregoing case, lens 2 can move along different directions in both the cases, i.e. while controller 9 obtains the image data (focus evaluation value) and when controller 9 stops lens 2 at the target place. In this case, controller 9 preferably calculates the target place taking the hysteresis into consideration Image-capturing device 300 in accordance with this embodiment refers to moving section 14 which moves lens 2 through the use of deformation of actuator 4 made of shape memory alloy; however, moving section 14 is not limited to actuator 4. For instance, moving section 14 can be formed of a stepping motor, or anther actuator, made of high-polymer, and this actuator bows along the optical axis when it receives a voltage.

Image-capturing device 300 in accordance with this embodiment refers to the target place which can be found by calculating the lens position where the focus evaluation value takes the max. value. Finding the target place is not limited to this calculation. For instance, a lens position can be found from a given equation by substituting focus evaluation values of the respective fields for the equation.

As discussed above, image-capturing device 300 in accordance with the second embodiment comprises the following structural elements:

lens 2 movable in the moving region corresponding to the focus region;

image sensor 5 for receiving light through lens 2; and controller 9 for obtaining image data received by image sensor 5 and controlling the position of lens 2.

Controller 9 moves lens 2 step by step in order to obtain the image data from respective fields provided in the focus region. Controller 9 thus moves lens 2 across entire moving region to obtain the image data from every field, and then calculates the target place, where lens 2 should be stopped, from the obtained image data. Controller 9 then stops lens 2 at the calculated target place.

The foregoing structure allows image-capturing device 300 to obtain the image data from all the fields in the focus region because lens 2 can be moved across the entire moving region. The target place for lens 2 is then calculated from the image data obtained from all the fields, and then lens 2 is stopped at the target place.

Image-capturing device 300 in accordance with the second embodiment allows controller 9 to move lens 2 along a given direction while controller 9 obtains the image data from all the fields, and yet, controller 9 moves lens 2 along the same direction as the given direction when it stops lens 2 at the target place. This mechanism allows lens 2 to move along the given direction while controller 9 obtains the image data from every field, and controller 9 stops lens 2 at the target place while lens 2 moves along the same direction as the given one. As a result, the error, caused by the hysteresis, in the movement of lens, i.e. error in positioning lens 2, can be prevented.

Image-capturing device 300 further includes actuator 4 made of shape memory alloy, and controller 9 controls a deformation amount of actuator 4, thereby controlling the position of lens 2. Because actuator 4 is deformed when it receives electric power, so that controller 9 controls the deformation amount of actuator 4 which connects with lens 2 for moving lens 2. Use of the shape memory alloy allows shortening the time necessary for lens 2 to move to a given place and settle down there, so that the image data can be obtained faster. As a result, image-capturing device 300 having a high-speed auto focus function is obtainable.

Image-capturing device 300 in accordance with the second embodiment further includes display device 8 which displays the image data received by image sensor 5. Since display device 8 displays the image data received by image sensor 5, the user can monitor the image data anytime.

Image-capturing device 300 in accordance with the second embodiment allows display device 8 to display one piece of image data and freeze it during a time span from when controller 9 obtains the image data from all the fields until lens 2 stops at the target place. This mechanism allows, e.g. display device 8 to display only an output from the final field and freezes it until lens 2 moves from the final field to the target place.

As discussed previously, image-capturing devices 200 and 300 of the present invention calculate the target place, where the lens should be stopped, from the image data obtained from substantially all the fields provided in the focus region. The lens thus can be stopped at the desired target place regardless of a shooting environment or a subject to be shot. The present invention is thus useful for electronic apparatuses such as cameras of portable telephones, digital cameras, and digital video cameras.

INDUSTRIAL APPLICABILITY

A lens drive device and an image-capturing device of the present invention can obtain reliable and stable data through the lens, and allow the lens to stop at a desirable target place regardless of a shooting environment or a subject to be shot. The lens drive device and the image-capturing device of the present invention are thus useful for electronic apparatuses (image-capturing apparatuses) such as cameras of portable telephones, digital cameras, and digital video cameras.

DESCRIPTION OF REFERENCE SIGNS

1 lens drive device
2 lens
3 lens barrel
4 actuator
5 image sensor
6 housing
7 substrate
8 display device
9 controller
10 detector
14 moving section

The invention claimed is:

1. A lens drive device comprising:
a lens movable in a moving region;
an actuator made of shape memory alloy for moving the lens;
a controller for controlling a position of the lens based on a characteristic value associated with the actuator, the characteristic value being varied by deformation of the actuator wherein the characteristic value fluctuates responsive to variance of an electrical signal; and
a detector for detecting that the characteristic value has reached an upper level and later reached a lower level lower than the upper level;
wherein said controller modifies said electrical signal in order to maintain said characteristic value between said upper level and said lower level,
wherein while the controller obtains image data from a given field among from the respective fields and when the detector detects that the characteristic value of the actuator is maintained in a predetermined range, the detector outputs a detection signal, and
wherein when the detection signal is supplied, the controller moves the lens to a place corresponding to a field next to the given field, and when no detection signal is supplied, the controller obtains the image data again from the given field.

2. An image-capturing device comprising:
the lens drive device as defined in claim 1; and
an image sensor for receiving light through the lens,
wherein the lens is movable in a moving region corresponding to a focus region,
wherein the controller moves the lens step by step from a place corresponding to a first field in order to obtain image data from respective fields provided in the focus region, and calculates a target place where the lens should be finally placed, and positions the lens at the target place based on the calculation.

3. The image-capturing device of claim 2,
wherein when the detector detects that the characteristic value of the actuator is maintained within the predetermined range, the detector outputs the detection signal in order to inform the controller of a fact that the lens is positioned at the place corresponding to the given field,
wherein the controller obtains image data from the given field after the detection signal is output.

4. The image-capturing device of claim 2,
wherein when the detector detects that the characteristic values of the actuator are maintained within the respective predetermined ranges, the detector outputs detection signals respectively in order to inform the controller of a fact that the lens is positioned at places corresponding to the respective fields,
wherein the controller obtains image data from the respective fields after the detection signals are output respectively.

5. The image-capturing device of claim 2,
wherein when the detector detects that the characteristic value of the actuator is maintained within the predetermined range, the detector outputs a detection signal in order to inform the controller of a fact that the lens is positioned at the target place,
wherein the controller obtains the image data after the detection signal is output.

6. The image-capturing device of claim 2,
wherein when the actuator receives electric power, the actuator deforms itself such that the lens can move along a predetermined direction, and when supply of the electric power to the actuator is halted, the actuator deforms itself such that the lens can move along an opposite direction to the predetermined direction,
wherein the controller controls a direction, along which the lens is moved step by step from the place corresponding to the given field, to be the predetermined direction along which the actuator moves the lens when the actuator receives the electric power.

7. The image-capturing device of claim 6,
wherein when the actuator receives the electric power, the actuator generates heat, and contracts, for deforming itself such that the lens can move along the predetermined direction, and when the supply of electric power is halted, the actuator dissipates heat spontaneously, and expands for deforming itself such that the lens can move along an opposite direction to the predetermined direction,
wherein the controller controls a direction, along which the lens is moved step by step from the place corresponding to the given field, to be the predetermined direction along which the lens is moved by the contraction of the actuator.

8. The image-capturing device of claim 7,
wherein the controller calculates a target region including the target place among from the respective fields by using the image data obtained from the respective fields, and subdivides the target region into a plurality of sub-fields,
wherein the controller moves the lens step by step from a place corresponding to a first sub-field in order to obtain the image data again from each one of the plurality of sub-fields, wherein the controller calculates the target place from the image data obtained from each one of the sub-fields.

9. The image-capturing device of claim 8, wherein the controller controls a direction, along which the lens moves step by step from the place corresponding to the first sub-field, to be the predetermined direction along which the lens is moved by the contraction of the actuator.

10. The image-capturing device of claim 8, wherein the controller controls a direction, along which the lens moves step by step from the place corresponding to the first sub-field, to be an opposite direction to the predetermined direction, wherein along the opposite direction the lens is moved by expansion of the actuator.

11. The image-capturing device of claim 8, wherein when the controller positions the lens at the target place, the controller moves the lens in an identical direction to a direction along which the controller moves the lens step by step from the place corresponding to the first sub-field.

12. The image-capturing device of claim 6 further comprising a display device,
wherein before the controller moves the lens step by step from the place corresponding to the given field, the controller controls the lens to be positioned at the predetermined place,
wherein the display device displays the image data and freezes the image data during a movement of the lens from the predetermined place to the place corresponding to the given field.

* * * * *

UNITED STATES PATENT AND TRADEMARK OFFICE
CERTIFICATE OF CORRECTION

PATENT NO.        : 8,692,929 B2                                       Page 1 of 1
APPLICATION NO.   : 13/003336
DATED             : April 8, 2014
INVENTOR(S)       : Kazuhiro Hata et al.

It is certified that error appears in the above-identified patent and that said Letters Patent is hereby corrected as shown below:

Title Page

At Item (86), "Jan. 10, 2001" should read -- Jan. 10, 2011 --.

Signed and Sealed this
Second Day of September, 2014

Michelle K. Lee
*Deputy Director of the United States Patent and Trademark Office*